(12) United States Patent
Tanaka

(10) Patent No.: US 12,028,647 B2
(45) Date of Patent: Jul. 2, 2024

(54) ELECTRO-OPTICAL DEVICE AND ELECTRONIC APPARATUS

(71) Applicant: SEIKO EPSON CORPORATION, Tokyo (JP)

(72) Inventor: Nobutaka Tanaka, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 18/523,139

(22) Filed: Nov. 29, 2023

(65) Prior Publication Data

US 2024/0179270 A1 May 30, 2024

(30) Foreign Application Priority Data

Nov. 30, 2022 (JP) ................. 2022-191192

(51) Int. Cl.
*H04N 5/74* (2006.01)
*G02F 1/1333* (2006.01)
*G02F 1/1335* (2006.01)

(52) U.S. Cl.
CPC ..... *H04N 5/7441* (2013.01); *G02F 1/133305* (2013.01); *G02F 1/133382* (2013.01); *G02F 1/133512* (2013.01)

(58) Field of Classification Search
None
See application file for complete search history.

(56) References Cited

U.S. PATENT DOCUMENTS

| | | | |
|---|---|---|---|
| 2004/0036834 A1 | 2/2004 | Ohnishi et al. | |
| 2005/0073642 A1* | 4/2005 | Dunn | G02F 1/133382 349/199 |
| 2014/0078408 A1* | 3/2014 | Shim | G02F 1/1313 349/2 |
| 2018/0045981 A1* | 2/2018 | Cornelius | G02F 1/13306 |
| 2020/0201109 A1* | 6/2020 | Zhao | G02F 1/133382 |
| 2024/0004230 A1* | 1/2024 | Cheng | H05B 3/84 |

FOREIGN PATENT DOCUMENTS

| | | | |
|---|---|---|---|
| JP | 2001215473 A | * | 8/2001 |
| JP | 2003131247 A | * | 5/2003 |
| JP | 2004-139018 A | | 5/2004 |
| JP | 2007-279096 A | | 10/2007 |
| JP | 2010-276909 A | | 12/2010 |

* cited by examiner

*Primary Examiner* — Shan Liu
(74) *Attorney, Agent, or Firm* — Oliff PLC

(57) ABSTRACT

An electro-optical device includes an element substrate provided with a plurality of pixel electrodes, a counter substrate provided with a common electrode, a liquid crystal sandwiched between the plurality of pixel electrodes and the common electrode, and a dust-proof glass bonded to at least one substrate of the element substrate or the counter substrate and having a heater disposed along an outer side of a display region in plan view.

13 Claims, 15 Drawing Sheets

ELECTRO-OPTICAL DEVICE AND ELECTRONIC APPARATUS

The present application is based on, and claims priority from JP Application Serial Number 2022-191192, filed Nov. 30, 2022, the disclosure of which is hereby incorporated by reference herein in its entirety.

BACKGROUND

1. Technical Field

The present disclosure relates to an electro-optical device and an electronic apparatus.

2. Related Art

For example, in a liquid crystal panel using a liquid crystal as an electro-optical layer, when a temperature of the liquid crystal is low, an optical response is reduced. Thus, a liquid crystal panel is known in which a heater is incorporated and the temperature of the liquid crystal is increased by heat generated by the heater to improve the optical response (see, for example, JP-A-2010-276909). Specifically, the liquid crystal panel described in JP-A-2010-276909 includes a liquid crystal sandwiched between a pixel electrode provided at a first substrate and a common electrode provided at a second substrate, a display region in plan view, and a light blocking region (picture frame region) defined outside the display region, wherein a heater is disposed in the display region and the picture frame region of the second substrate.

However, in the technique described in JP-A-2010-276909, since the common electrode and the heater provided at the second substrate are close to each other, a parasitic capacitance between the common electrode and the heater increases. Thus, when a voltage applied to the heater fluctuates, the fluctuation of the voltage is propagated to the common electrode via the parasitic capacitance and adversely affects the display.

In view of such circumstances, an aspect of the present disclosure is to provide a technique in which display is less likely to be affected even when a voltage applied to a heater fluctuates.

SUMMARY

In order to solve the above problems, an electro-optical device according to one aspect of the present disclosure includes a first substrate provided with a plurality of pixel electrodes, a second substrate provided with a common electrode, an electro-optical layer sandwiched between the plurality of pixel electrodes and the common electrode, and a third substrate bonded to at least one substrate of the first substrate or the second substrate and including a heating member disposed along an outer side of a display region in plan view.

DESCRIPTION OF EMBODIMENTS

An electro-optical device according to exemplary embodiments will be described below with reference to the accompanying drawings. Note that in each of the drawings, dimensions and scale of each part are made different from actual ones as appropriate. Further, embodiments described below are suitable specific examples, and various technically preferable limitations are applied, but the scope of the disclosure is not limited to these embodiments unless they are specifically described in the following description as limiting the disclosure.

First Exemplary Embodiment

Figure 1:
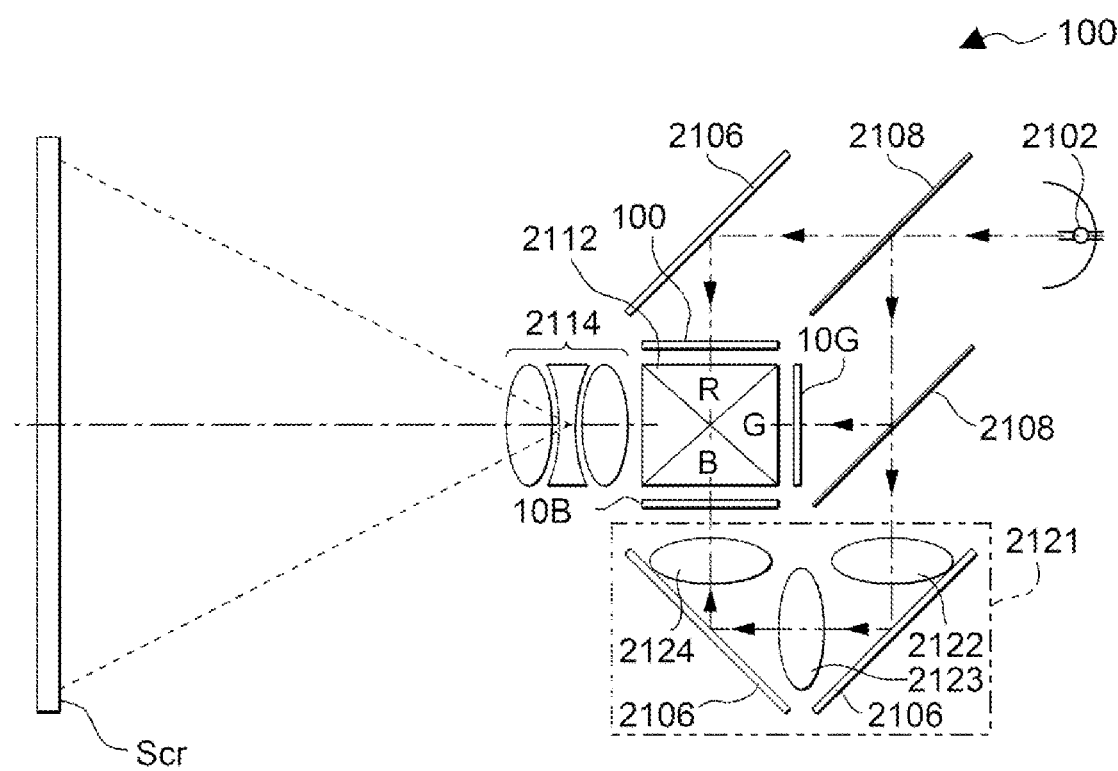
FIG. 1 is a diagram illustrating an optical configuration of a projection-type display apparatus to which an electro-optical device according to a first exemplary embodiment is applied.

FIG. 1 is a diagram illustrating an optical configuration of a projection-type display apparatus 100 to which an electro-optical device according to a first exemplary embodiment is applied. As illustrated in the drawing, the projection-type display apparatus 100 includes electro-optical devices 10R, 10G, and 10B. Further, the projection-type display apparatus 100 is provided with a lamp unit 2102 including a white light source such as a halogen lamp. Projection light emitted from the lamp unit 2102 is separated into three primary colors of red (R), green (G), and blue (B) by three mirrors 2106 and two dichroic mirrors 2108. Of the light of the primary colors, light of R is incident on the electro-optical device 10R, light of G is incident on the electro-optical device 10G, and light of B is incident on the electro-optical device 10B, respectively.

Note that since an optical path of B is longer than each of optical paths of R and G, it is necessary to prevent a loss in the B optical path. Thus, a relay lens system 2121 including an incidence lens 2122, a relay lens 2123, and an emission lens 2124 is provided at the B optical path.

In the exemplary embodiment, the electro-optical device 10R is a liquid-crystal panel having a plurality of pixel circuits. Each of the plurality of pixel circuits includes a liquid crystal element. The liquid crystal element of the electro-optical device 10R is driven based on a data signal corresponding to R as will be described below, and has a transmittance corresponding to an effective value of a voltage of the data signal. Therefore, in the electro-optical device 10R, the transmittance of the liquid crystal element is individually controlled, so that a transmitted image of R is generated. Similarly, in the electro-optical device 10G, a transmitted image of G is generated based on a data signal corresponding to G, and in the electro-optical device 10B, a transmitted image of B is generated based on a data signal corresponding to B.

The transmitted images of the respective colors generated by the electro-optical devices 10R, 10G, and 10B are incident on a dichroic prism 2112 from three directions. At the dichroic prism 2112, the light of R and the light of B are refracted at 90 degrees, whereas the light of G travels in a straight line. Thus, the dichroic prism 2112 combines the images of the respective colors. The combined image formed by the dichroic prism 2112 is incident on a projection lens 2114. The projection lens 2114 enlarges and projects the combined image formed by the dichroic prism 2112 onto a screen Scr.

The transmitted images formed by the electro-optical devices 10R and 10B are emitted after being reflected by the dichroic prism 2112, whereas the transmitted image formed by the electro-optical device 10G travels straight and is emitted. Therefore, the transmitted images by the electro-optical devices 10R and 10B are in a relationship of being laterally inverted with respect to the transmitted image of the electro-optical device 10G.

Figure 2:
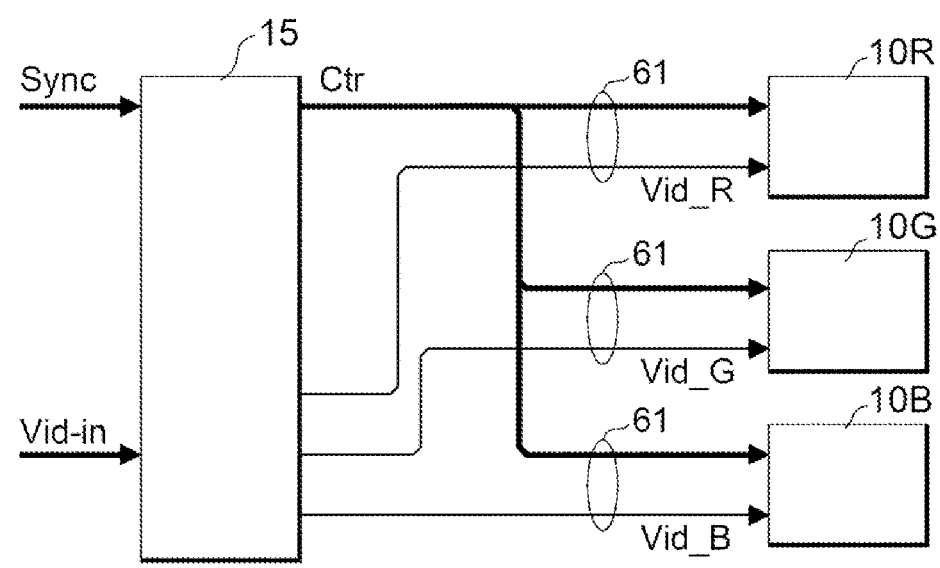
FIG. 2 is a block diagram illustrating an electrical configuration of a drive system in the electro-optical device.

FIG. 2 is a block diagram illustrating a configuration for controlling display in the electrical configuration of the projection-type display apparatus 100. As illustrated in the drawing, the projection-type display apparatus 100 includes the above-described electro-optical devices 10R, 10G, and 10B and a display control circuit 15.

Video data Vid-in is supplied to the display control circuit 15 in synchronization with a synchronization signal Sync from a higher-level device such as a host device (not illustrated). The video data Vid-in designates a gray scale level of a pixel in an image to be displayed for each of RGB, for example, by 8 bits.

In the projection-type display apparatus 100, the color image projected on the screen Scr is expressed by combining the transmitted images of the electro-optical devices 10R, 10G, and 10B as described above. Therefore, a pixel which is a minimum unit of a color image can be divided into a red sub-pixel by the electro-optical device 10R, a green sub-pixel by the electro-optical device 10G, and a blue sub-pixel by the electro-optical device 10B. However, regarding the sub-pixels in the electro-optical devices 10R, 10G, and 10B, when it is not necessary to specify the color, or when only brightness is a problem, etc., it is not necessary to describe the sub-pixels. Therefore, in this description, a display unit in the electro-optical devices 10R, 10G, and 10B is simply referred to as a pixel.

The synchronization signal Sync includes a vertical synchronization signal that instructs a start of vertical scanning of the video data Vid-in, a horizontal synchronization signal that instructs a start of horizontal scanning, and a clock signal that indicates a timing for one video pixel in the video data Vid-in.

The display control circuit 15 divides the video data Vid-in from the higher-level device into RGB components, converts the RGB components into analog voltage data signals, and supplies the analog voltage data signals to the electro-optical devices 10R, 10G, and 10B. In detail, the display control circuit 15 converts the R component of the video data Vid-in into an analog signal, and supplies the analog signal as a data signal Vid-R to the electro-optical device 10R via a flexible printed circuits (FPC) substrate 61. Similarly, the display control circuit 15 converts the G component of the video data Vid-in into an analog signal and supplies the analog signal as a data signal Vid-G to the electro-optical device 10G via the FPC substrate 61, and converts the B component into an analog signal and supplies the analog signal as a data signal Vid-B to the electro-optical device 10B via the FPC substrate 61.

The display control circuit 15 sequentially supplies the data signals Vid_R, Vid_G, and Vid_B via the FPC substrate 61 in synchronization with a control signal Ctr for controlling the driving of the electro-optical devices 10R, 10G, and 10B.

Next, the electro-optical devices 10R, 10G, and 10B will be described. The electro-optical devices 10R, 10G, and 10B are different only in the color of incident light, that is, the wavelength, and otherwise have the same structure. Therefore, the electro-optical devices 10R, 10G, and 10B are denoted by a reference numeral 10 and will be generally described without specifying the color.

Figure 3:
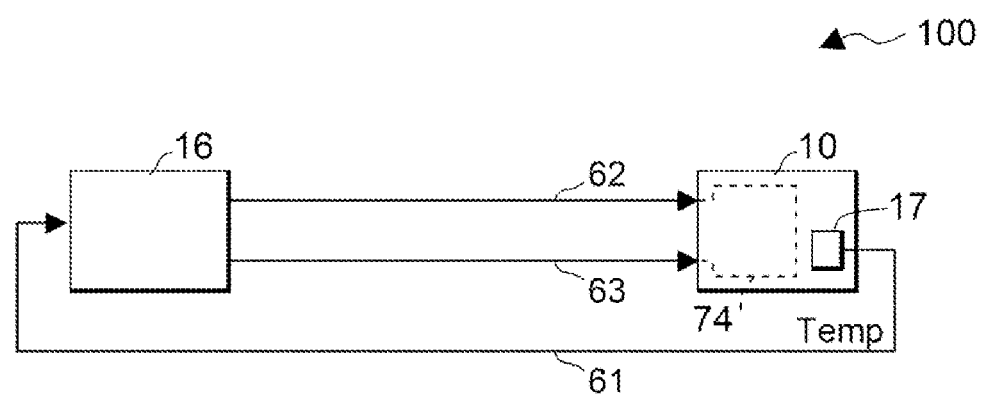
FIG. 3 is a diagram illustrating a configuration for controlling a heater of the electro-optical device.

FIG. 3 is a block diagram illustrating a configuration for controlling heating of the electro-optical device 10. The electro-optical device 10 is provided with a heater 74 and a temperature sensor 17. The heater 74 is an example of a heating member. A temperature control circuit 16 applies a voltage to the heater 74 via FPC substrates 62 and 63.

The temperature sensor 17 detects a temperature of the electro-optical device 10 and outputs information Temp indicating the temperature as a detection value. The information Temp is supplied to the temperature control circuit 16 via an FPC substrate different from the FPC substrates 62 and 63, for example, an FPC substrate 61.

The temperature control circuit 16 controls the voltage applied to the heater 74 so that the temperature indicated by the information Temp becomes a target temperature. Specifically, if the temperature indicated by the information Temp is lower than the target temperature, the temperature control circuit 16 increases the voltage applied to the heater 74.

The target temperature is a temperature suitable for use of the electro-optical device 10, and is set in advance in the temperature control circuit 16. Further, the fluctuation of the voltage applied to the heater 74 acts as a noise source. Thus, the temperature control circuit 16 is configured to control the voltage applied to the heater 74 at a constant voltage, and switches the applied voltage in a stepwise manner, for example, every minute in accordance with the temperature indicated by the information Temp. However, the voltage applied to the heater 74 inevitably fluctuates.

Figure 4:
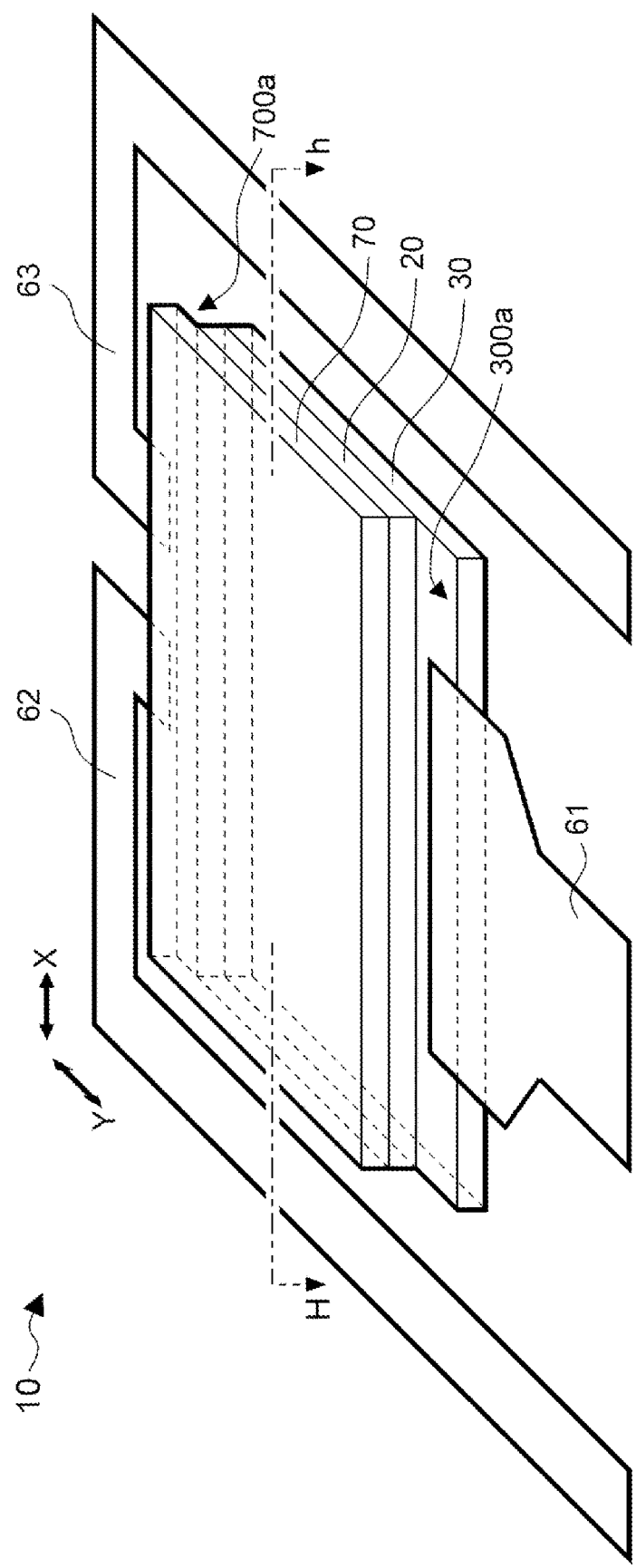
FIG. 4 is a perspective view illustrating the electro-optical device.
Figure 5:
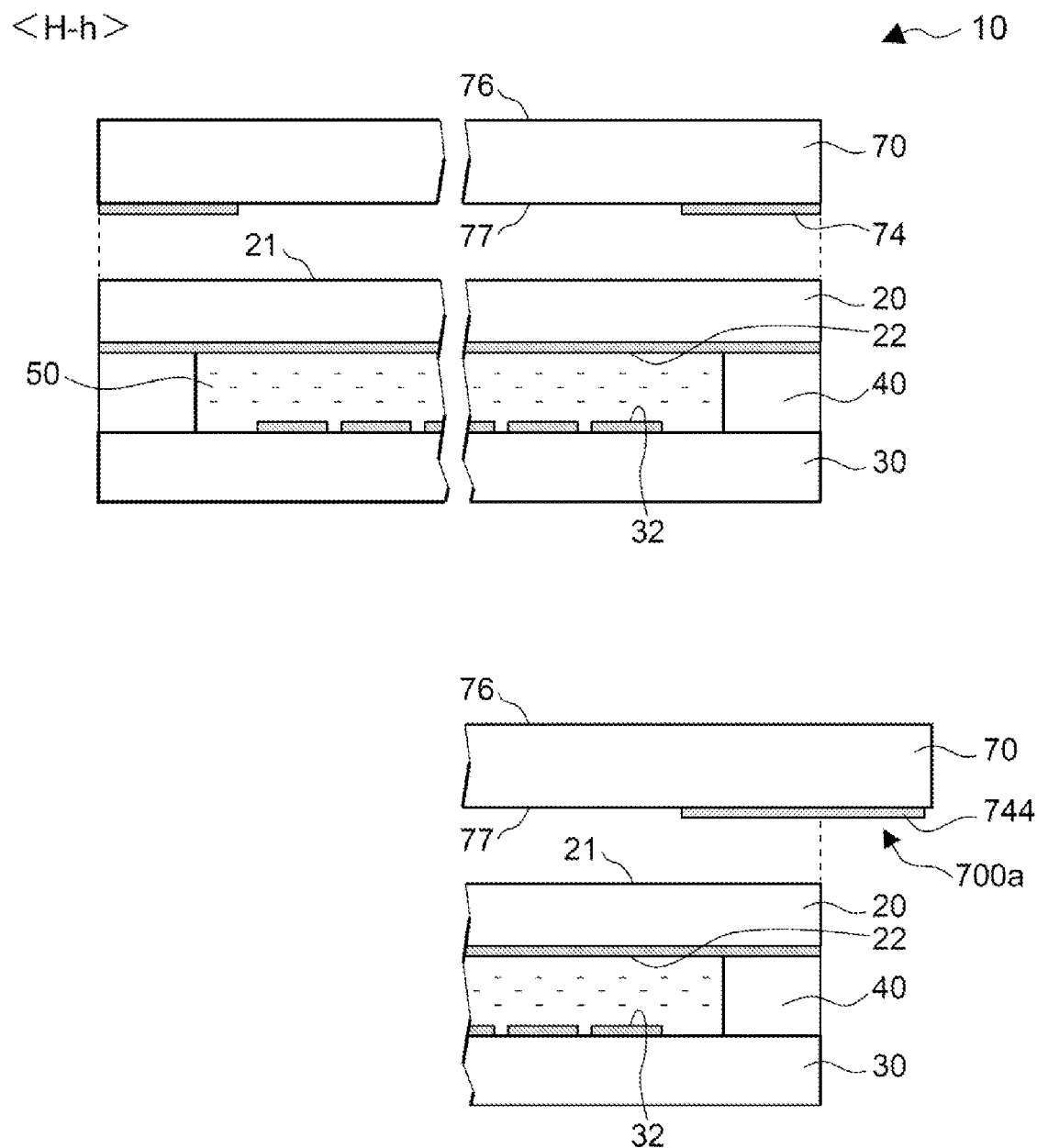
FIG. 5 is a cross-sectional view illustrating a structure of the electro-optical device.

FIG. 4 is a perspective view illustrating an appearance of the electro-optical device 10, and the upper column of FIG. 5 is a cross-sectional view taken along a line H-h in FIG. 4. In addition, the line H-h is a virtual line for cutting, along the X-axis, a region where a counter substrate 20 and an element substrate 30 overlap with each other in the electro-optical device 10. In addition, the lower column of FIG. 5 is a cross-sectional view of a main portion of the electro-optical device 10 which is cut along the Y-axis to include a coupling portion 744 which will be described below.

As illustrated in the upper column and the lower column of FIG. 5, in the electro-optical device 10, the counter substrate 20 at which a common electrode 22 is provided and the element substrate 30 at which a pixel electrode 32 is provided are bonded to each other by a sealing material 40, such that the electrode forming surfaces face each other while maintaining a constant gap, and a liquid crystal 50 is sealed in the gap.

In the present exemplary embodiment, a dust-proof glass 70 is further bonded to the counter substrate 20. In FIG. 5, the dust-proof glass 70 and the counter substrate 20 are separated from each other for the sake of explanation, but actually, the dust-proof glass 70 and the counter substrate 20 are in close contact with each other as illustrated in FIG. 4.

When dust, dirt, etc. adheres to an incident surface 21 of the counter substrate 20, the adhering matter is enlarged and projected on the screen Scr because the incident surface 21 is close to the focal point, and thus the display quality deteriorates. In order to prevent this, the dust-proof glass 70 is bonded to the counter substrate 20. Even if the dust, dirt, etc. adheres to the dust-proof glass 70, the adhering matter is distant from the focal point by the thickness of the glass. Therefore, since the adhering matter is blurred, and enlarged and projected on the screen Scr, the deterioration of the display quality is suppressed.

The element substrate 30 is an example of a first substrate, the counter substrate 20 is an example of a second substrate, the dust-proof glass 70 is an example of a third substrate, and the liquid crystal 50 is an example of an electro-optical layer.

As illustrated in FIG. 4, in the exemplary embodiment, the counter substrate 20 and the element substrate 30 have the same length of sides along the X-axis. The length of the side of the counter substrate 20 along the Y-axis is smaller than the length of the side of the element substrate 30 along the Y-axis. Since the counter substrate 20 and the element substrate 30 are aligned with each other on the rear side in FIG. 4, the element substrate 30 is provided with a protruding portion 300a which protrudes from the counter substrate 20.

Note that the Y-axis does not define the orientation in the direction in which the data line extends in the electro-optical device 10, and runs along a short side of a display region described below. The X-axis, which will be described below, intersects the Y-axis in plan view, and does not define the orientation in the direction in which the scanning line extends in the electro-optical device 10. The X-axis runs along a long side of the display region.

In addition, in the present description, the plan view means that the substrate is viewed from a direction perpendicular to the substrate surface, that is, a thickness direction of the substrate. The cross-sectional view means that the substrate is viewed by being cut in the direction perpendicular to the substrate surface.

As each of the counter substrate 20, the element substrate 30, and the dust-proof glass 70, a base material having optical transparency and insulation properties, such as glass or quartz, is used. A plurality of terminals (not illustrated) are provided at the protruding portion 300a, and one end of the flexible printed circuits (FPC) substrate 61 is coupled to the terminals. The FPC substrate 61 is an example of a first flexible substrate.

The other end of the FPC substrate 61 is coupled to the display control circuit 15 and the temperature control circuit 16. Accordingly, the data signal and the control signal described above are supplied from the display control circuit 15 to the electro-optical device 10, and the information Temp indicating the temperature is supplied from the electro-optical device 10 to the temperature control circuit 16.

In the counter substrate 20 and the dust-proof glass 70, the lengths of the sides along the X-axis are the same. The length of the side of the counter substrate 20 along the Y-axis is smaller than the length of the side of the dust-proof glass 70 along the Y-axis. Since the counter substrate 20 and the dust-proof glass 70 are aligned with each other on the front side in FIG. 4, the dust-proof glass 70 protrudes from the counter substrate 20. This protruding portion is referred to as a protruding portion 700a.

The protruding portion 700a is provided with two terminals coupled to the heater 74, and one end of each of the FPC substrates 62 and 63 is coupled thereto. The other end of the FPC substrates 62 and 63 are coupled to the temperature control circuit 16. Accordingly, a voltage controlled by the temperature control circuit 16 is applied to the heater 74 via the FPC substrates 62 and 63. The FPC substrates 62 and 63 are examples of a second flexible substrate.

Each of the FPC substrates 62 and 63 has a configuration in which bending of 90 degrees is repeated twice. This is because the temperature control circuit 16 is provided on the same side as the display control circuit 15 with respect to the electro-optical device 10.

In the electro-optical device 10, light from the lamp unit 2102 is incident from the dust-proof glass 70 and is emitted from the element substrate 30.

For convenience of description, a surface of the dust-proof glass 70 on which light is incident (upper surface in FIG. 5) is referred to as an incident surface 76, and a surface from which light is emitted (lower surface in FIG. 5) is referred to as an emission surface 77. The incident surface 76 is located on an opposite side from the counter substrate 20 bonded to the dust-proof glass 70, and thus is an example of an opposite surface. The emission surface 77 is located on a side facing the counter substrate 20, and thus is an example of a counter surface.

Figure 6:
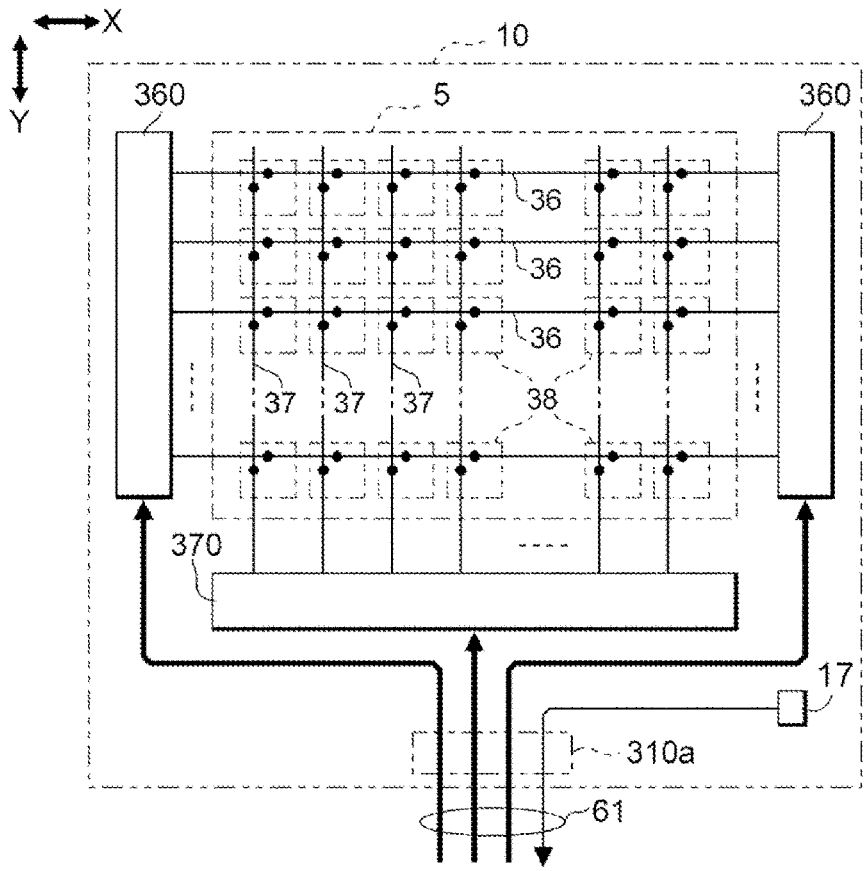
FIG. 6 is a block diagram illustrating an electrical configuration of the electro-optical device.

An electrical configuration of the electro-optical device 10 will be described. FIG. 6 is a block diagram illustrating an electrical configuration of the electro-optical device 10.

In the element substrate 30 of the electro-optical device 10, a scanning line drive circuit 360 and a data line drive circuit 370 are provided on the periphery of the display region 5.

In detail, a plurality of scanning lines 36 are provided extending along the X-axis on the element substrate 30. A plurality of data lines 37 extend along the Y-axis and are provided to be electrically insulated from the scanning lines 36. Pixel circuits 38 are provided in a matrix corresponding to the intersections of the plurality of scanning lines 36 and the plurality of data lines 37.

When the number of scanning lines 36 is m and the number of data lines 37 is n, the pixel circuits 38 are arranged in a matrix of m rows and n columns. m and n are each an integer of 2 or greater. In the scanning lines 36 and the pixel circuits 38, in order to distinguish the rows of the matrix, the rows may be referred to as first, second, third, . . . , (m−1)-th, and m-th rows in order from the top in the drawing. Similarly, in the data line 37 and the pixel circuits 38, in order to distinguish the columns of the matrix, the columns may be referred to as first, second, third, . . . , (n−1)-th, and n-th columns in order from the top in the drawing.

The scanning line drive circuit 360 selects the scanning lines 36 one by one in the order of, for example, the first, second, third, . . . , and m-th rows according to the control signal Ctr from the display control circuit 15, and sets the scanning signal to the selected scanning line 36 to the H level. Note that the scan line driver circuit 360 sets scan signals to the scan lines 36 other than the selected scan line 36 to the L level.

The data line drive circuit 370 latches the data signal supplied from the display control circuit 15 for one row, and outputs the data signal to the pixel circuit 38 located on the scanning line 36 through the data line 37 in a period during which the scanning signal to the scanning line 36 is at the H level.

A terminal for supplying the control signal Ctr to the scanning-line drive circuit 360, a terminal for supplying a data signal, etc. to the data line drive circuit 370, and a terminal for supplying information Temp from the temperature sensor 17 to the temperature control circuit 16 are provided in a region 310a in the protruding portion 300a. The terminal provided in the region 310a is an example of a first coupling portion.

Figure 7:
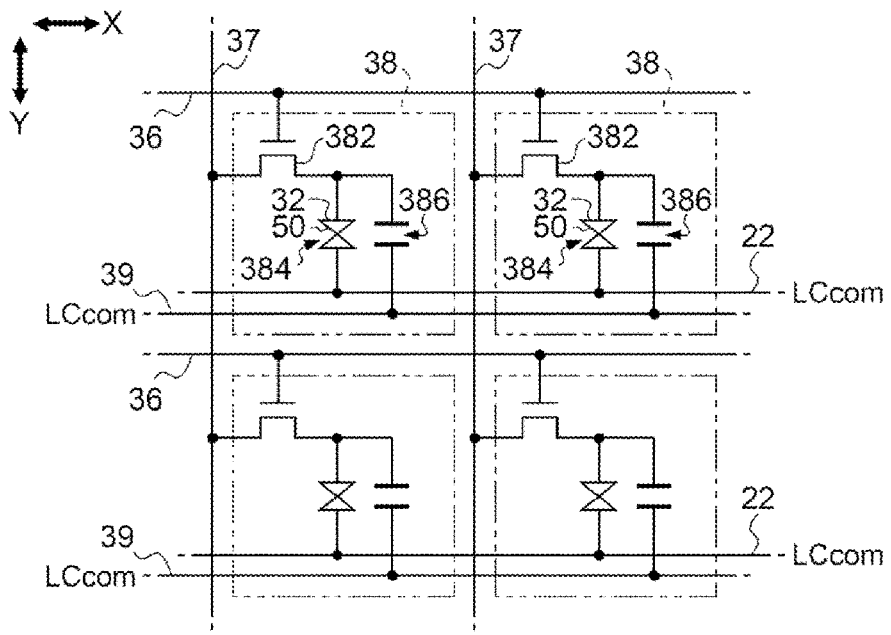
FIG. 7 is a diagram illustrating a configuration of a pixel circuit in the electro-optical device.

FIG. 7 is a diagram illustrating an equivalent circuit of the pixel circuits 38. Note that FIG. 7 illustrates an equivalent circuit of a total of four pixel circuits 38, two in the vertical direction and two in the horizontal direction, corresponding to the intersections of two adjacent scanning lines 36 and two adjacent data lines 37. The pixel circuits 38 have the same circuit configuration.

The pixel circuit 38 includes a transistor 382, a liquid crystal element 384, and a storage capacitor 386. The transistor 382 is, for example, an n-channel thin film transistor. In the pixel circuit 38, the gate electrode of the transistor 382 is electrically coupled to the scanning line 36. In addition, a source region of the transistor 382 is electrically coupled to the data line 37, and a drain region thereof is electrically coupled to the pixel electrode 32 and one end of the storage capacitor 386.

In the transistor 382, when the direction in which the current flows is reversed, the source region and the drain region are switched. However, in this description, a region electrically coupled to the data line 37 is referred to as a source region, and a region electrically coupled to the pixel electrode 32 is referred to as a drain region.

In addition, in the present description, "electrically coupled" or simply "coupled" means direct or indirect coupling or binding between two or more elements, and for example, includes a case where two or more elements are not directly coupled to each other in an element substrate, but different wirings are coupled to each other through a contact hole.

The common electrode 22 is provided in common to all the pixels to face the pixel electrode 32. A constant voltage LCcom is applied to the common electrode 22 with the passage of time. As described above, the liquid crystal 50 is sandwiched between the pixel electrode 32 and the common electrode 22. Therefore, the liquid crystal element 384, in which the liquid crystal 50 is sandwiched between the pixel electrode 32 and the common electrode 22, is configured for each pixel circuit 38.

The storage capacitor 386 is provided electrically in parallel with the liquid crystal element 384. One end of the storage capacitor 386 is electrically coupled to the pixel electrode 32, and the other end is electrically coupled to a capacitor line 39. A voltage that is constant over time, for example, the same voltage LCcom as the voltage applied to the common electrode 22, is applied to the capacitor line 39.

In the scanning line 36 in which the scanning signal is at the H level, the transistor 382 of the pixel circuit 38 provided corresponding to the scanning line 36 is turned on. When the transistor 382 is turned on, the data line 37 and the pixel electrode 32 are electrically coupled to each other, and thus the data signal supplied to the data line 37 reaches the pixel electrode 32 and one end of the storage capacitor 386 via the transistor 382 that has been turned on. When the scanning line 36 is at the L level, the transistor 382 is turned off, but the voltage of the data signal that has reached the pixel electrode 32 is held by the liquid crystal element 384 and the storage capacitor 386.

As is well known, in the liquid crystal element 384, the alignment of liquid crystal molecules changes in accordance with an electric field generated by the pixel electrode 32 and the common electrode 22. Therefore, the liquid crystal element 384 has a transmittance corresponding to the effective value of the applied voltage.

Note that in the case where the liquid crystal element 384 is in a normally black mode, the transmittance increases as the voltage applied to the liquid crystal element 384 increases.

The operation of supplying the data signal to the pixel electrode 32 of the liquid crystal element 384 is performed in the order of the first, second, third, . . . , and m-th rows in one vertical scanning period. Accordingly, a voltage corresponding to the data signal is held in each of the liquid crystal elements 384 of the pixel circuits 38 arranged in m rows and n columns, and each of the liquid crystal elements 384 has a target transmittance, and then a transmitted image of a corresponding color is generated by the liquid crystal elements 384 arranged in m rows and n columns.

In this way, the transmitted image is generated for each of RGB, and the color image obtained by combining RGB is projected onto the screen Scr.

In the electro-optical device 10, a region where a transmitted image is generated is a region where the pixel electrodes 32 and the common electrodes 22 arranged in a matrix overlap with each other in plan view. Therefore, the display region 5 is a region where the pixel electrodes 32 and the common electrodes 22 arranged in a matrix overlap with each other in plan view.

The projection-type display apparatus 100 may be used not only indoors but also outdoors. The optical response of the liquid crystal element 384, specifically, a change characteristic of the transmittance with respect to a change in voltage applied to the liquid crystal element 384, decreases as the temperature decreases. Thus, in the present exemplary embodiment, the heater 74 is provided to heat the liquid crystal element 384, in particular, the liquid crystal 50, in order to prevent the optical response from being lowered even when the outside air temperature is lowered.

In a configuration in which the heater 74 is provided at the counter substrate 20, since the heater 74 and the common electrode 22 are close to each other, a parasitic capacitance between the heater 74 and the common electrode 22 increases. Therefore, in the present exemplary embodiment, the dust-proof glass 70 is provided as described above.

Figure 8:
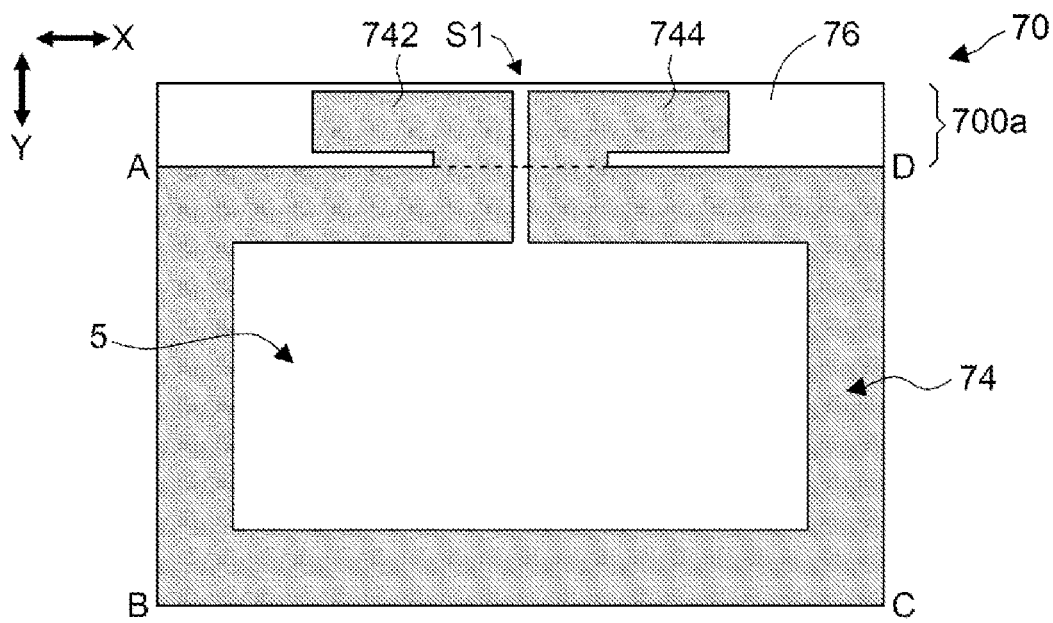
FIG. 8 is a plan view illustrating a dust-proof glass in the electro-optical device.

FIG. 8 is a plan view illustrating the configuration of the heater 74 provided at the dust-proof glass 70 of the electro-optical device 10. For convenience of description, FIG. 8 is a diagram in which the counter substrate 20 and the element substrate 30 of the electro-optical device 10 are separated from each other and the dust-proof glass 70 provided with the heater 74 is viewed from a direction in which light from the lamp unit 2102 is incident.

As described above, the counter substrate 20 and the element substrate 30 are separated from the electro-optical device 10, and the dust-proof glass 70 provided with the heater 74 is viewed from the incident direction of light, which is the same in FIGS. 11, 13, 15, 17, and 18 described below.

Figure 9:
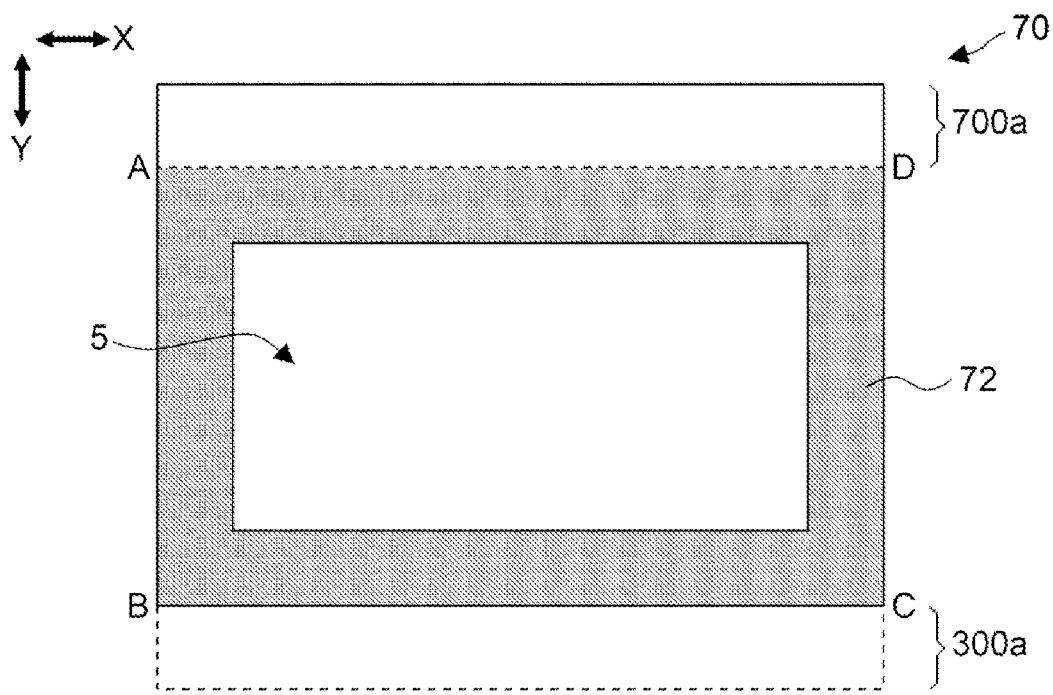
FIG. 9 is a plan view illustrating a region to be shielded from light in the electro-optical device.

First, a region to be shielded in the electro-optical device 10 will be described with reference to FIG. 9. FIG. 9 is a diagram illustrating a region to be shielded when the electro-optical device 10 is viewed in plan view.

In the electro-optical device 10, the dust-proof glass 70, the counter substrate 20, and the element substrate 30 are bonded in this order from the light incident direction. The protruding portion 300a of the element substrate 30 is provided on the front side in FIG. 4 and on the lower side in FIG. 9, and the protruding portion 700a of the dust-proof glass 70 is provided on the rear side in FIG. 4 and on the upper side in FIG. 9.

In FIG. 9, a frame-shaped region 72 to which hatching is applied is a region in which the counter substrate 20 and the element substrate 30 overlap with each other, and is a region to be shielded from light in a shape excluding the display region 5, that is, a region serving as a picture frame (parting).

For convenience, corners of the outer shape of the rectangle in which the counter substrate 20 and the element substrate 30 overlap with each other are denoted by A, B, C, and D in this order. In other words, the region 72 has a frame shape obtained by excluding the display region 5 from a rectangle having the sides AB, BC, CD, and DA as four sides.

Here, the outside of the side BC is the protruding portion 300a, and the outside of the side DA is the protruding portion 700a in plan view.

The sealing material 40 for bonding the counter substrate 20 and the element substrate 30 to each other is provided to have a width narrower than that of the region 72 in plan view.

The scanning line drive circuit 360 and the data line drive circuit 370 are provided overlapping with the region 72 in the element substrate 30 in plan view. In detail, one of the two scanning line drive circuits 360 is provided overlapping with a portion of the region 72 along the side AB, and the remaining one is provided overlapping with a portion of the region 72 along the side CD. The data line drive circuit 370 is provided overlapping with a portion along the side BC in the region 72 in plan view in the element substrate 30.

In the first exemplary embodiment, the light blocking member is not provided in the region 72, but is substituted by the light blocking function of the heater 74 provided in the dust-proof glass 70.

Specifically, as illustrated in the upper column and the lower column of FIG. 5 in a cross-sectional view, the heater 74 is provided at the emission surface 77 of the dust-proof glass 70 with the counter substrate 20.

As illustrated in FIG. 8 in plan view, the heater 74 is provided overlapping with the region 72. However, the heater 74 is provided with a slit S1 at the midpoint of the side AB, and is electrically divided into one end and the other end. The one end is extended to the protruding portion 700a to form a coupling portion 742, and the other end is extended to the protruding portion 700a to form a coupling portion 744.

One end of the FPC substrate 62 is coupled to the coupling portion 742, and one end of the FPC substrate 63 is coupled to the coupling portion 744. The coupling portions 742 and 744 in a protruding portion 200a are an example of a second coupling portion.

The first exemplary embodiment is an example in which the region 310a of the element substrate 30 is provided at one side outside the region 72 in which the counter substrate 20 and the element substrate 30 overlap with each other in plan view, and the coupling portions 742 and 744 of the heater 74 in the dust-proof glass 70 are provided at the other side of the region 72 excluding the above one side in plan view, wherein the other side faces the one side.

The heater 74 is a wiring film obtained by patterning a conductive layer having a light blocking property and conductivity, such as aluminum (Al), titanium nitride (TiN), or tungsten silicide (WSi), and has the coupling portion 742 at one end and the coupling portion 744 at the other end when viewed electrically. The heater 74 generates heat when a current flows from one of the coupling portion 742 and the coupling portion 744 to the other.

In this description, the term "layer" refers to an insulating layer or a conductive layer which is not patterned, and the term "wiring" or a "film" refers to an insulating layer or a conductive layer which is patterned.

In the electro-optical device 10 according to the first exemplary embodiment, the heater 74 is provided not at the counter substrate 20 on which the common electrode 22 is provided, but at the dust-proof glass 70 which is different from the counter substrate 20. Thus, according to the first exemplary embodiment, a distance between the heater 74 and the common electrode 22 is increased by the thickness of the counter substrate 20, compared to a configuration in which the heater 74 is provided at the counter substrate 20. Therefore, even when the voltage applied to the heater 74 is switched, the fluctuation of the voltage is unlikely to propagate to the common electrode 22 via the parasitic capacitance, and thus it is possible to suppress an adverse effect on the display.

The heater 74 has both a heating function of the liquid crystal 50 and a light blocking function of the region 72 from light. Thus, it is not necessary to provide a light blocking member in the region 72 in the counter substrate 20, and the configuration is simplified.

In the first exemplary embodiment, the coupling portions 742 and 744 are provided outside the side DA, but the present disclosure is not limited to this configuration. Therefore, a first modification in which the coupling portions 742 and 744 are provided outside sides other than the side DA will be described.

Figure 10:
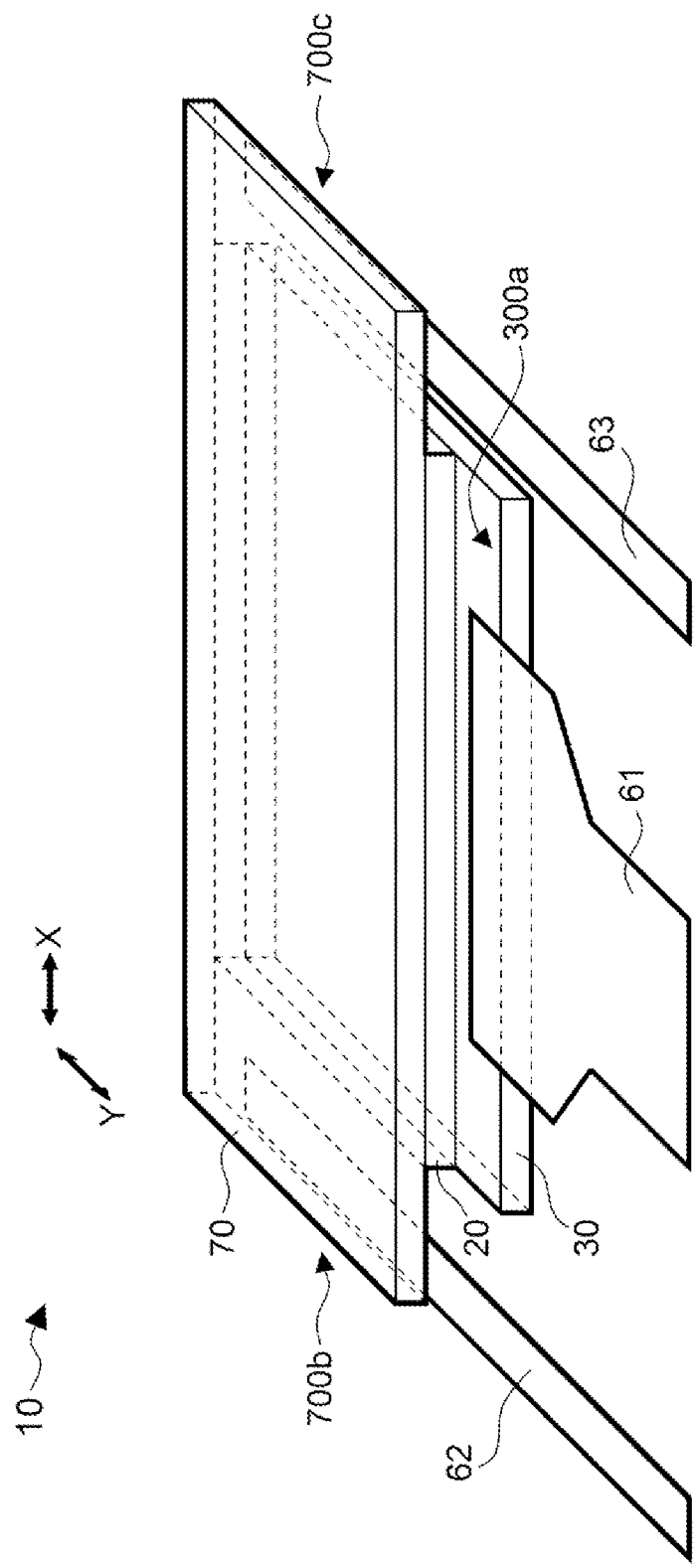
FIG. 10 is a perspective view illustrating a structure of an electro-optical device according to a first modification of the first exemplary embodiment.
Figure 11:
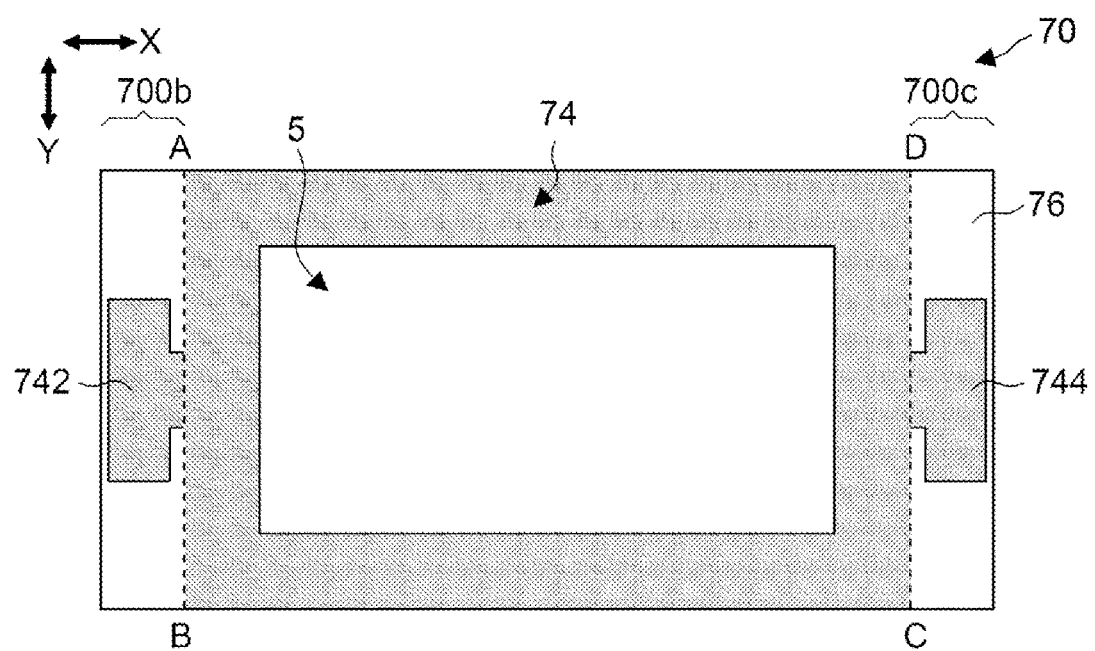
FIG. 11 is a plan view illustrating a dust-proof glass in the electro-optical device.

FIG. 10 is a perspective view illustrating a structure of the electro-optical device 10 according to the first modification of the first exemplary embodiment, and FIG. 11 is a plan view illustrating the dust-proof glass 70 according to the first modification.

As illustrated in these drawings, in the first modification, the length of the side along the Y-axis is the same in the counter substrate 20 and the element substrate 30. The length of the side of the counter substrate 20 along the X-axis is smaller than the length of the side of the element substrate 30 along the X-axis. The counter substrate 20 and the element substrate 30 are aligned on the rear side in FIG. 4. Therefore, the dust-proof glass 70 protrudes from the counter substrate 20 on both sides of the X-axis. Among these, a portion which protrudes to the left from the element substrate 30 is referred to as a protruding portion 700b, and a portion which protrudes to the right is referred to as a protruding portion 700c.

In the first modification, as illustrated in FIG. 11 in plan view, the heater 74 includes a portion overlapping with the region 72, a portion extending to the protruding portion 700b at the midpoint of the side AB to form the coupling portion 742, and a portion extending to the protruding portion 700c at the midpoint of the side CD to form the coupling portion 744.

In the first modification, as illustrated in FIG. 10, the one end of the FPC substrate 62 is coupled to the coupling portion 742, and the one end of the FPC substrate 63 is coupled to the coupling portion 744.

The first modification is an example in which the region 310a of the element substrate 30 is provided at one side outside the region 72 in which the counter substrate 20 and the element substrate 30 overlap with each other in plan view, and the coupling portions 742 and 744 of the heater 74 in the dust-proof glass 70 are provided at the other side of the region 72 excluding the above one side in plan view, wherein the other side intersects the one side.

According to the first modification, as in the first exemplary embodiment, even when the voltage applied to the heater 74 is switched, the fluctuation of the voltage is unlikely to propagate to the common electrode via the parasitic capacitance, and thus it is possible to suppress an adverse effect on the display.

In addition, in the first modification, the path length of the current flowing from one of the coupling portions 742 and 744 to the other is reduced to a half as compared with the first exemplary embodiment, so that the current easily flows. Therefore, when the voltage applied to the coupling portions 742 and 744 is the same as in the first exemplary embodiment and the material of the heater 74 is the same (when the resistivity is the same), the film thickness of the heater 74 in the first modification can be suppressed to half compared to the first exemplary embodiment, and the same amount of heat generation as in the first exemplary embodiment can be obtained.

The first exemplary embodiment and the first modification are examples in which the heater 74 is provided at the emission surface 77 of the dust-proof glass 70, but the disclosure is not limited thereto. Therefore, a second modification in which the heater 74 is provided at the incident surface 76 of the dust-proof glass 70 will be described.

Figure 12:
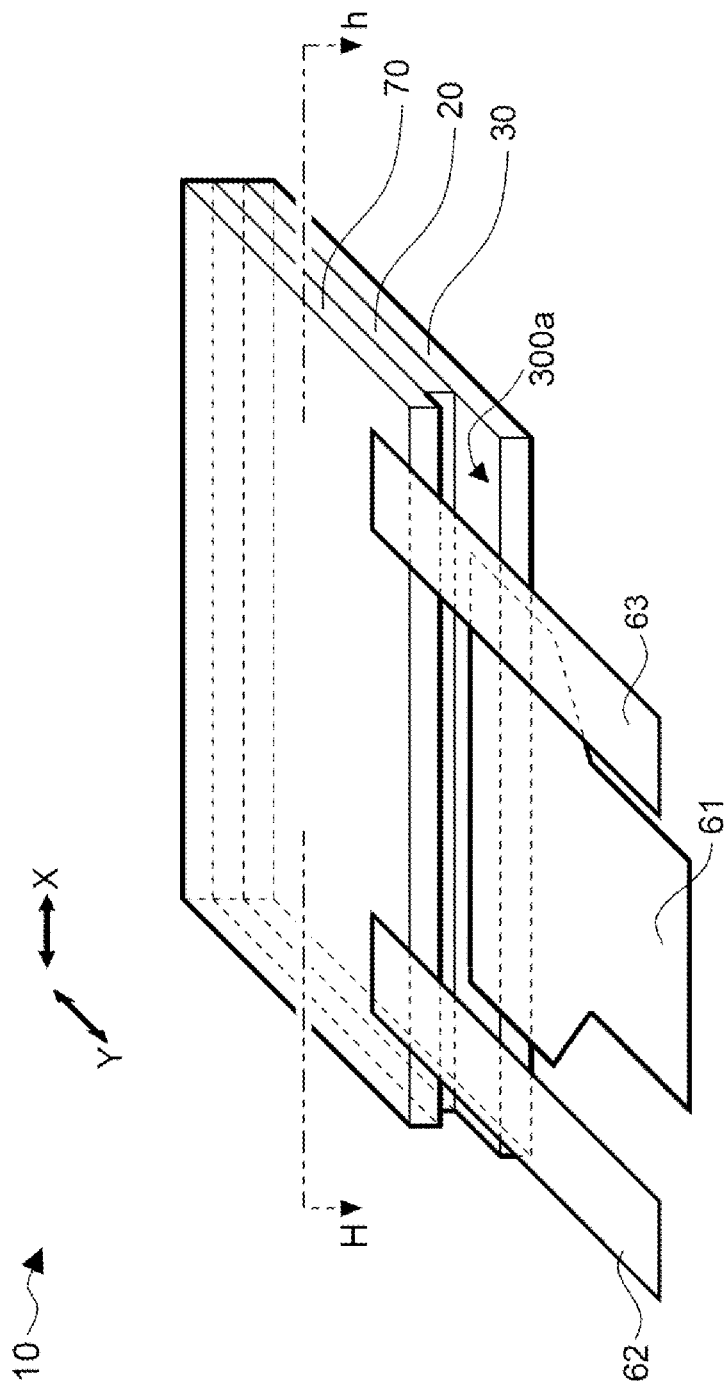
FIG. 12 is a perspective view illustrating a structure of an electro-optical device according to a second modification of the first exemplary embodiment.
Figure 13:
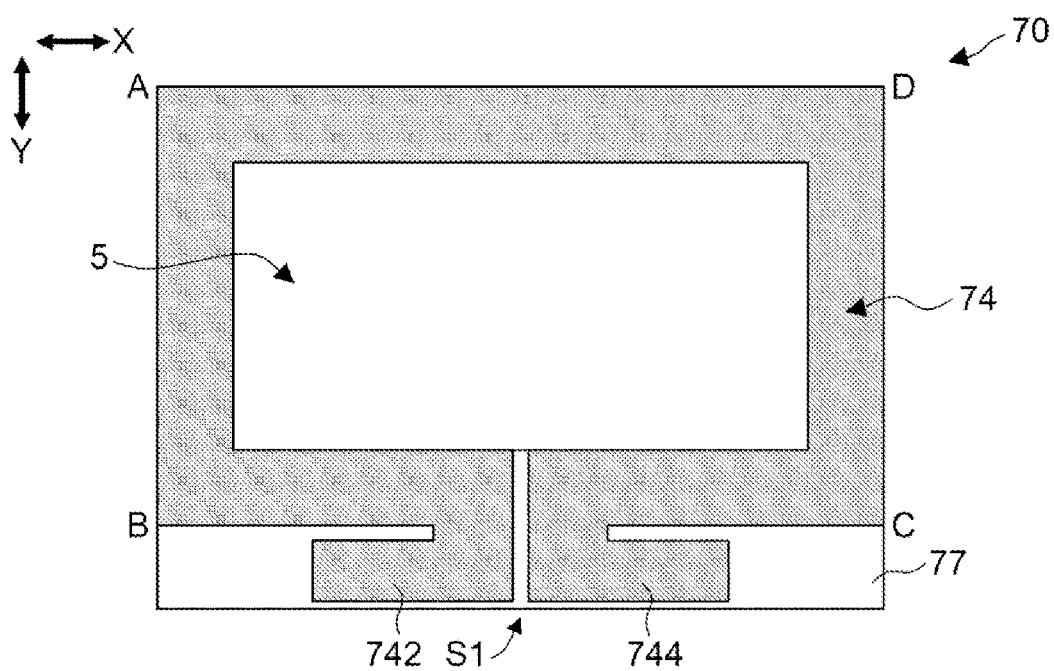
FIG. 13 is a plan view illustrating a dust-proof glass in the electro-optical device.
Figure 14:
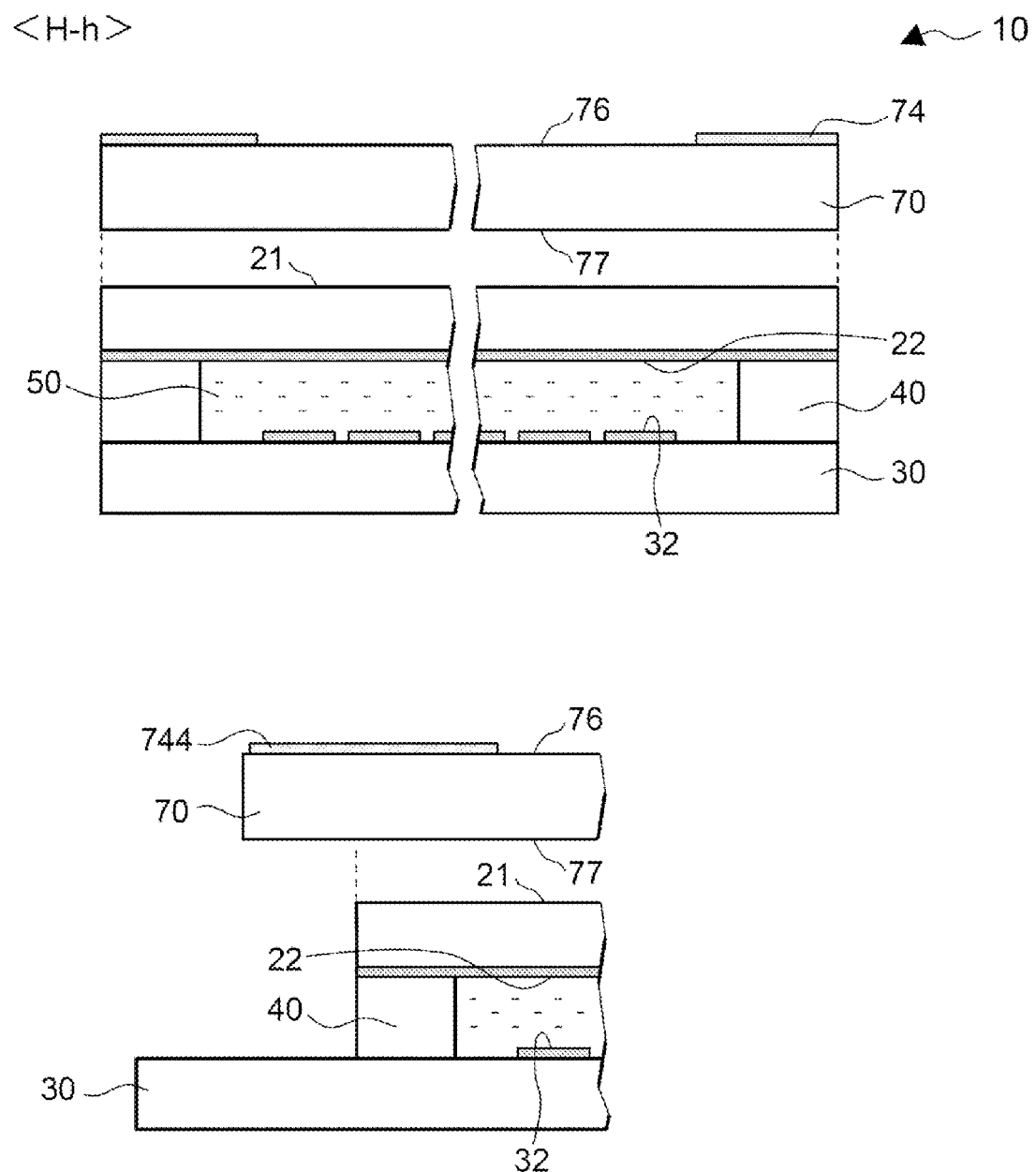
FIG. 14 is a cross-sectional view illustrating the structure of the electro-optical device.

FIG. 12 is a perspective view illustrating the structure of the electro-optical device 10 according to the second modification of the first exemplary embodiment, and FIG. 13 is a plan view illustrating the dust-proof glass 70 according to the second modification. The upper column of FIG. 14 is a cross-sectional view of the electro-optical device 10 according to the second modification taken along the line H-h of FIG. 12, and the lower column of FIG. 12 is a cross-sectional view of a main portion of the electro-optical device 10 taken along the Y-axis to include the coupling portion 744.

In the second modification, as illustrated in FIG. 13 in plan view, the heater 74 is provided overlapping with the region 72, but the slit S1 is provided at the midpoint of the side AB, and the heater 74 is electrically divided into one end and the other end. The one end and the other end are provided on the outside of the side BC of the rectangle in the region 72 to form coupling portions 742 and 744, respectively. The coupling portion 742 is coupled to the one end of the FPC substrate 62, and the coupling portion 744 is coupled to the one end of the FPC substrate 63.

In FIG. 13, the shape of the heater 74 in plan view is rotated by 180 degrees with respect to the shape of the heater 74 in FIG. 8.

According to the second modification, since the distance between the heater 74 and the common electrode 22 is greater than that of the first exemplary embodiment by the thickness of the dust-proof glass 70, the voltage fluctuation of the heater 74 is less likely to propagate to the common electrode 22, and it is possible to further suppress the adverse effect on the display.

In FIG. 12, the FPC substrates 62 and 63 for the heater are provided at the incident surface 76 of the dust-proof glass 70, but the present disclosure is not limited thereto. For example, the heater 74 may be provided at the emission surface 77 of the dust-proof glass 70, and the FPC substrates 62 and 63 may be drawn out from the emission surface 76.

Next, the electro-optical device 10 according to a second exemplary embodiment will be described. In the second exemplary embodiment, the display region 5 is heated by a transparent heater film in plan view.

Figure 15:
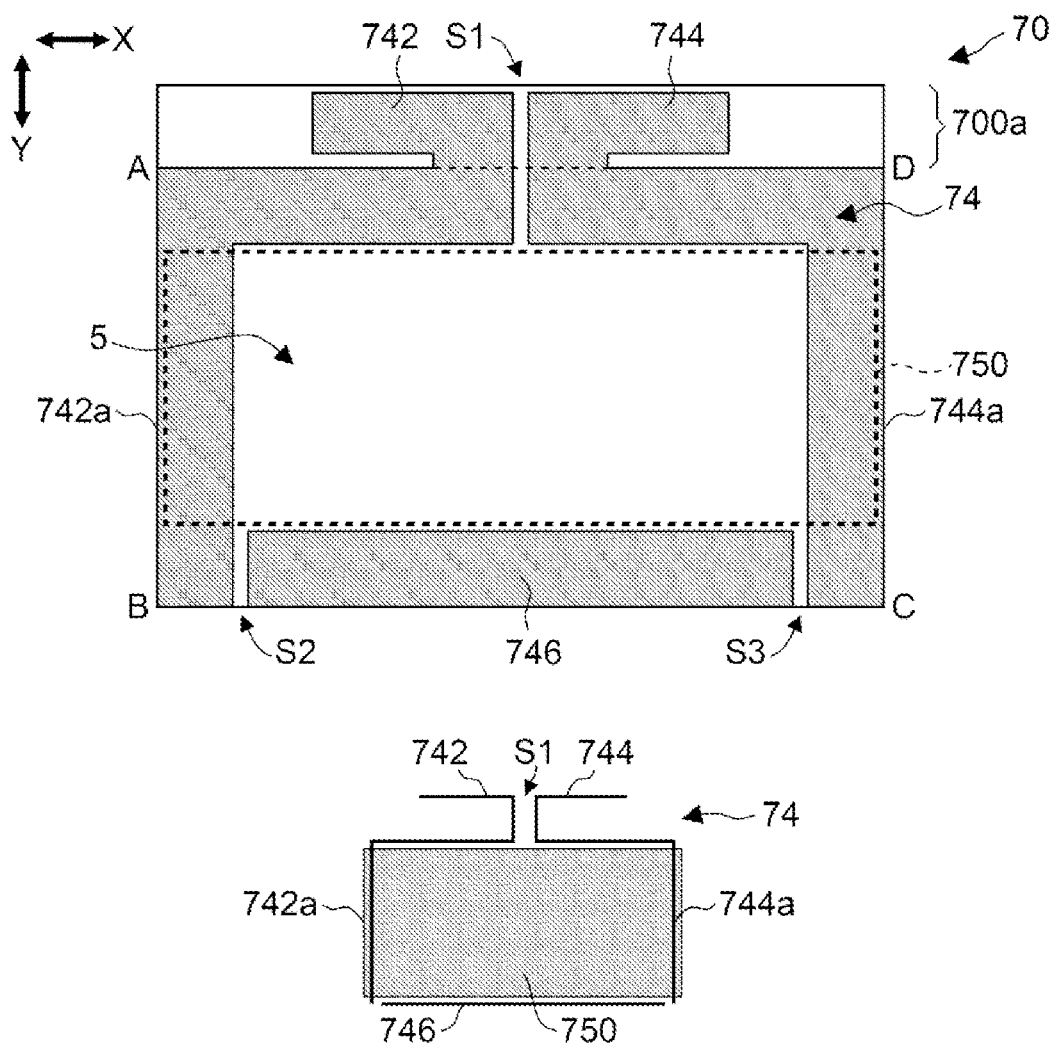
FIG. 15 is a plan view illustrating a dust-proof glass in an electro-optical device according to a second exemplary embodiment.

The upper column of FIG. 15 is a plan view illustrating the dust-proof glass 70 of the electro-optical device 10 according to the second exemplary embodiment, and the lower column of FIG. 15 is a diagram illustrating each element in the heater 74.

In the second exemplary embodiment, the heater 74 is divided into heater wiring 740 and a heater film 750.

The heater wiring 740 is provided overlapping with the region 72 as illustrated in the upper column of FIG. 15 in plan view. However, the heater wiring 740 is provided with S2 and S3 in addition to the slit S1 by the patterning of the conductive film, and is electrically separated into three portions as illustrated in the lower column of FIG. 15.

The three portions of the heater wiring 740 are a frame portion 742a integrated with the coupling portion 742, a frame portion 744a integrated with the coupling portion 744, and a frame portion 746.

In detail, the slit S1 is provided at the midpoint of the side DA, and the frame portions 742a and 774b are divided. One end of the frame portion 742a is extended to the protruding portion 700a to form the coupling portion 742, and one end of the frame portion 744a is extended to the protruding portion 700a to form the coupling portion 744. One end of the FPC substrate 62 is coupled to the coupling portion 742, and one end of the FPC substrate 63 is coupled to the coupling portion 744. In addition, the frame portion 746 along the side BC is separated from the frame portion 742a by the slit S2, and is separated from the frame portion 744a by the slit S3.

The heater film 750 having a rectangular shape in plan view is provided in a region whose outer shape is indicated by a broken line in the upper column of FIG. 15 and which is hatched in the lower column of FIG. 15.

The heater film 750 is formed by patterning a conductive layer such as indium tin oxide (ITO) having transparency and conductivity into a rectangular shape.

The heater film 750 is electrically coupled to a portion of the frame portion 742a along the side AB and a portion of the frame portion 744a along the side CD. The heater film 750 is not electrically coupled to a portion along the side DA in the frame portion 742a and the frame portion 744a in order to prevent a current from locally flowing.

Similarly, the heater film 750 is not electrically coupled to the frame portion 746. Therefore, the frame portion 746 is not electrically coupled to any of the frame portions 742a and 744a and the heater film 750, and has only a light blocking function.

The heater film 750 is an example of a transparent electrode.

The appearance of the electro-optical device 10 according to the second exemplary embodiment is the same as that of the first exemplary embodiment whose perspective view is illustrated in FIG. 4, for example.

Figure 16:
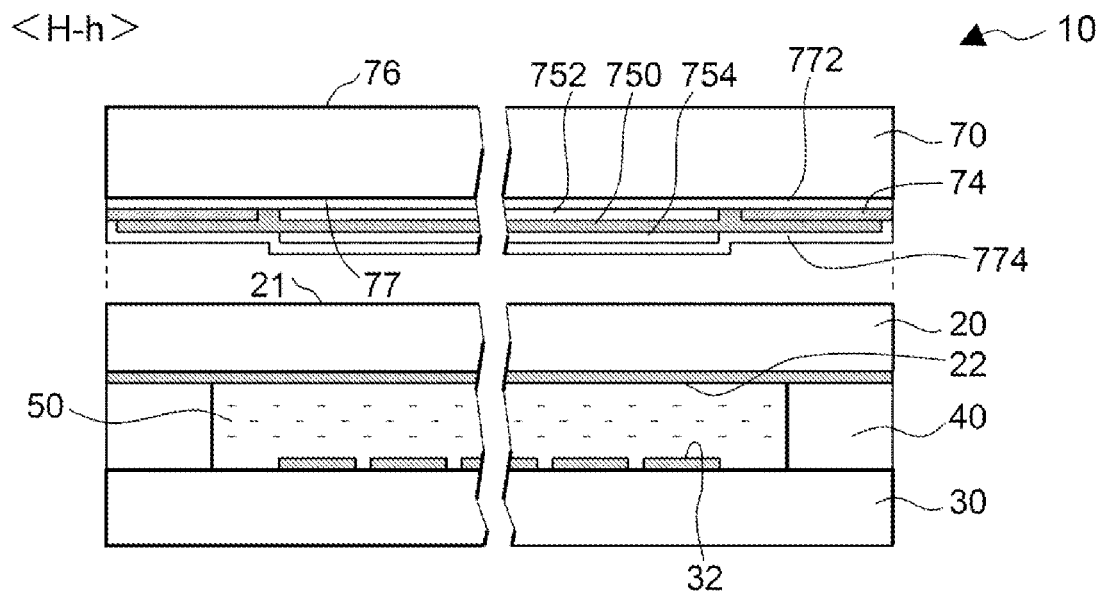
FIG. 16 is a cross-sectional view illustrating the structure of the electro-optical device.
Figure 16:
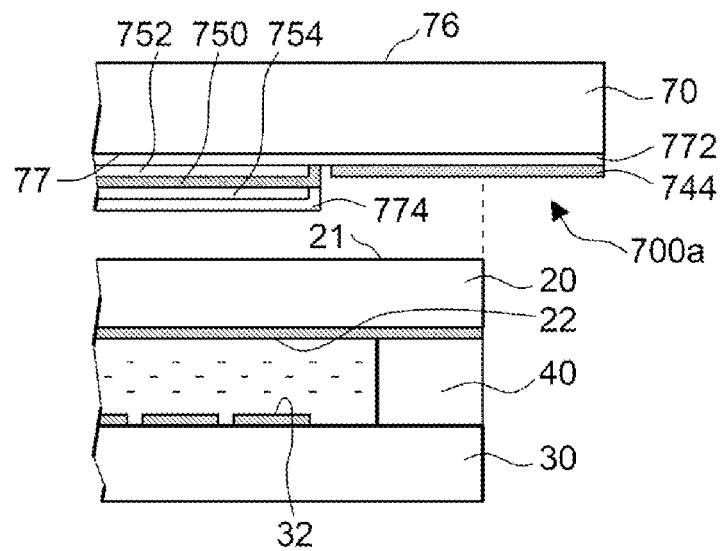

The upper column of FIG. 16 is a cross-sectional view of the electro-optical device 10 according to the second exemplary embodiment cut along the line H-h of FIG. 4, and the lower column of FIG. 16 is a cross-sectional view of a main portion of the electro-optical device 10 cut along the Y-axis to include the coupling portion 744.

In the second exemplary embodiment, on the emission surface 77 of the dust-proof glass 70, an insulating layer 772, a refractive film 752, the heater film 750, a refractive film 754, and an insulating film 774 are provided in this order. The heater wiring 740 is provided before or after the refractive film 752 is formed.

In this configuration, the refractive film 752 is provided closer to the incident surface 76 with respect to the heater film 750, that is, on the upper surface in the drawing, and the refractive film 754 is provided closer to the emission surface 77 with respect to the heater film 750, that is, on the lower surface in the drawing.

For example, the upper surface of the heater film 750 is an example of a first surface, and the lower surface of the heater film 750 is an example of a second surface.

A refractive index of the refractive film 752 has a value between a refractive index of the heater film 750 and a refractive index of the insulating layer 772. For example, when the refractive index of the heater film 750 is 1.80 and the refractive index of the insulating layer 772 is 1.45, the refractive index of the refractive film 752 is set within the range of 1.45 or more and less than 1.80. In addition, for example, when the refractive index of the heater film 750 is 2.00 and the refractive index of the insulating layer 772 is 1.70, the refractive index of the refractive film 752 is set within the range of 1.70 or more and less than 2.00.

As described above, the refractive index of the refractive film 752 is equal to or higher than the refractive index of the insulating layer 772 and lower than the refractive index of the heater film 750, and is preferably 1.80 or more and less than 2.00.

In a configuration in which the refractive film 752 is not provided, the heater film 750 and the insulating layer 772 are in direct contact with each other. In such a contact configuration, the difference between the refractive index of the heater film 750 and the refractive index of the insulating layer 772 increases, and the amount of reflected light at the interface increases. Therefore, the amount of light passing through the liquid crystal element 384 is reduced, so that the contrast ratio is decreased and the display quality is decreased.

In contrast, in the present exemplary embodiment, since the refractive film 752 is provided between the heater film 750 and the insulating layer 772, the difference in refractive index is reduced, and the amount of reflected light at the interface is reduced. Thus, the amount of light passing through the liquid crystal element 384 is greater than that in a configuration in which the refractive film 752 is not provided, and thus it is possible to suppress a decrease in contrast ratio and to suppress a decrease in display quality.

The refractive index of the refractive film 754 provided between the heater film 750 and the insulating film 774 is the same as that of the refractive film 752, and has a value between the refractive index of the heater film 750 and the refractive index of the insulating film 774.

The refractive films 752 and 754 are provided by patterning an insulating layer having insulating properties and transparency, such as a silicon nitride film (SiON), silicon nitride (SiN), or alumina (Al2O3).

In the second exemplary embodiment, the refractive film 752 is provided at the upper surface of the heater film 750, and the refractive film 754 is provided at the lower surface of the heater film 750. However, a configuration may be adopted in which the refractive film is provided at only one of the surfaces. Even in a configuration in which the refractive film is provided at only one of the surfaces, the amount of light reflected at the interface between the surfaces is small, and thus the amount of light is greater than that in a configuration in which the other of the refractive films 752 and 754 is not provided.

In the second exemplary embodiment, the insulating layer 772 may not be provided. In a configuration in which the insulating layer 772 is not provided, the refractive film 752 is located between the base material of the dust-proof glass 70 and the heater film 750. Thus, the refractive index of the refractive film 752 is equal to or higher than the refractive index of the base material of the dust-proof glass 70 and lower than the refractive index of the heater film 750.

Similarly, the insulating film 774 may not be provided. In a configuration in which the insulating film 774 is not provided, the refractive film 754 is located between the base material of the counter substrate 20 and the heater film 750 after being bonded to the counter substrate 20. Thus, the refractive index of the refractive film 754 is equal to or higher than the refractive index of the base material of the dust-proof glass 70 and lower than the refractive index of the heater film 750.

Note that the shape of the heater wiring 740 in the second exemplary embodiment in plan view is not limited to the shape illustrated in the upper column of FIG. 15.

Figure 17:
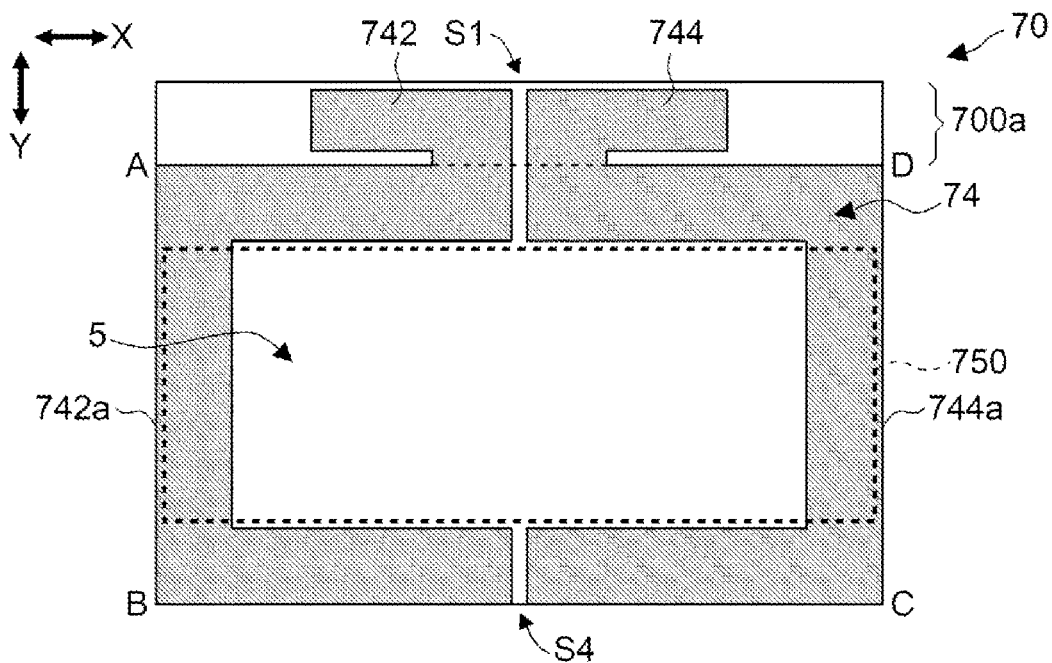
FIG. 17 is a plan view illustrating a dust-proof glass according to a first modification of the second exemplary embodiment.

FIG. 17 is a plan view of the heater wiring 740 of the dust-proof glass according to the first modification of the second exemplary embodiment. In the first modification, the frame portions 742a and 744a of the heater wiring 740 are separated by a slit S4 provided at the midpoint of the side BC. When separated by the slit S4, the heater film 750 is not electrically coupled to the frame portion 742a and the portion along the side BC in the frame portion 744a in order to prevent a current from flowing.

Figure 18:
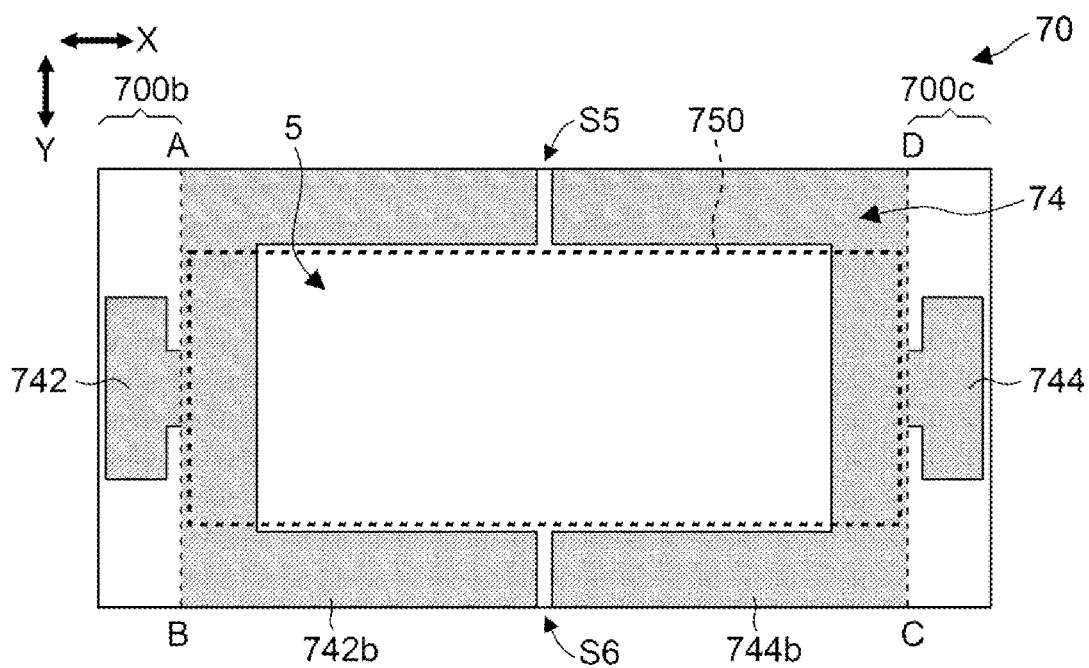
FIG. 18 is a plan view illustrating a dust-proof glass according to a second modification of the second exemplary embodiment.

FIG. 18 is a plan view of the heater wiring 740 of the dust-proof glass according to the second modification of the second exemplary embodiment. In the second modification, the heater wiring 740 having the shape illustrated in FIG. 11 is separated by the frame portions 742b and 744b by a slit S5 provided at the midpoint of the side DA and a slit S6 provided at the midpoint of the side BC.

In addition, in the second exemplary embodiment, including the first modification and the second modification, the heater film 250 is provided at the emission surface 77 of the dust-proof glass 70 overlapping with the display region 5 in plan view, but may be provided at the incidence surface 76 as in the second modification of the first exemplary embodiment. Therefore, a third modification in which the heater film 250 is provided at the incident surface 76 will be described.

The appearance of the electro-optical device 10 according to the third modification of the second exemplary embodiment is the same as that of the second modification of the first exemplary embodiment whose perspective view is illustrated in FIG. 12, for example.

Figure 19:
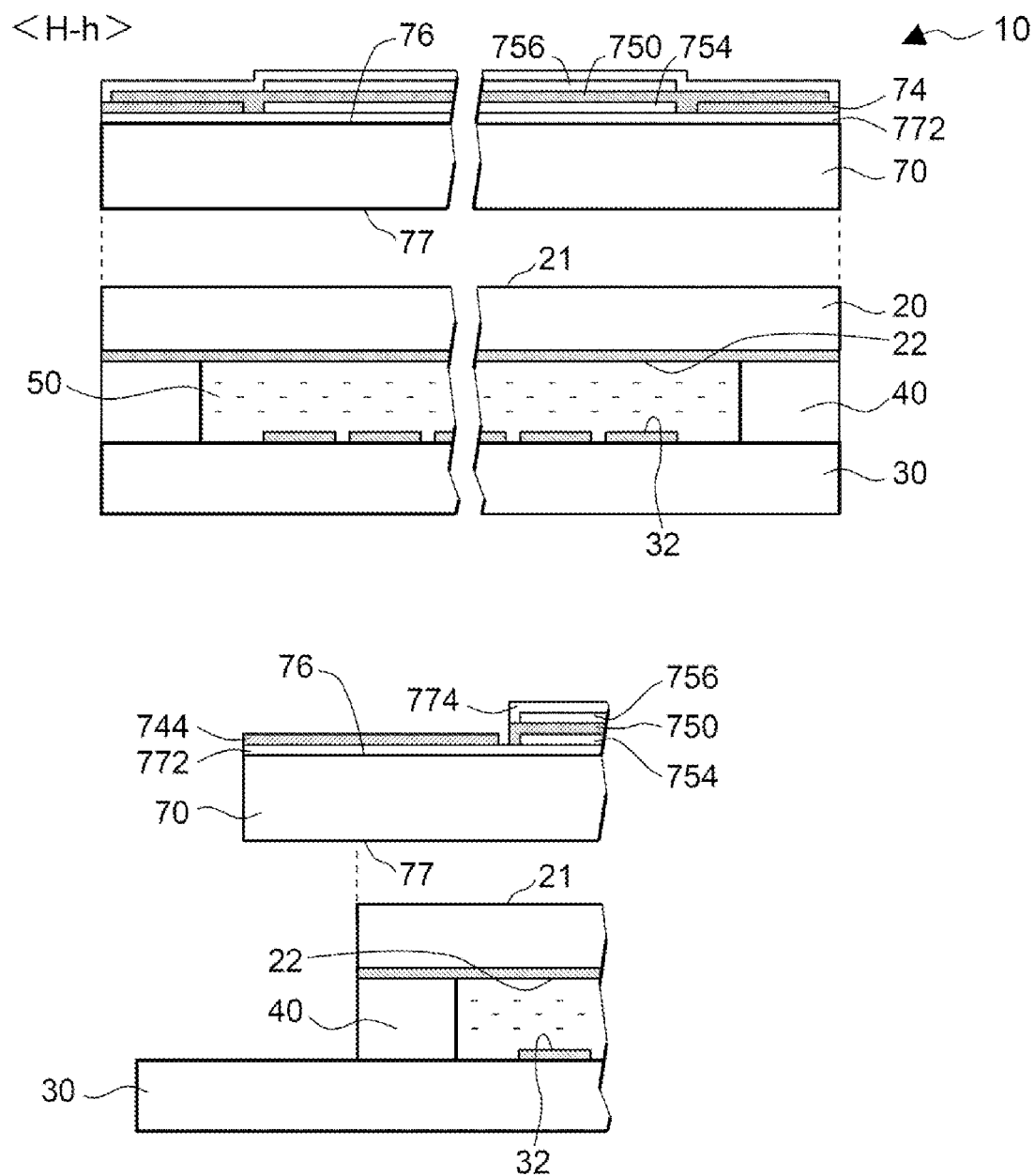
FIG. 19 is a cross-sectional view illustrating a structure of an electro-optical device according to a third modification of the second exemplary embodiment.

The upper column of FIG. 19 is a cross-sectional view of the electro-optical device 10 according to the third modification of the second exemplary embodiment, which is cut along the line H-h of FIG. 12, and the lower column of FIG. 19 is a cross-sectional view of a main portion of the electro-optical device 10, which is cut along the Y-axis to include the coupling portion 744.

In the third modification, the insulating layer 772, the refractive film 752, the heater film 750, the refractive film 754, and the insulating film 774 are provided in this order on the incident surface 76 of the dust-proof glass 70. The heater wiring 740 is provided before or after the refractive film 752 is formed.

In the third modification, the shapes of the heater wiring 740 and the heater film 750 in plan view may be a shape obtained by rotating the shape illustrated in FIG. 15 by 180 degrees, a shape obtained by rotating the shape illustrated in FIG. 17 by 180 degrees, or a shape illustrated in FIG. 18.

The above-described first exemplary embodiment including the first and second modifications and the second exemplary embodiment including the first to third modifications (hereinafter, referred to as "exemplary embodiments, etc.") can be applied and modified as follows.

In the exemplary embodiment, etc., the heater 74 provided at the dust-proof glass 70 is configured to heat the liquid crystal 50 and to shield the scanning line drive circuit 360 and the data line drive circuit 370 from light, but the disclosure is not limited to this configuration. For example, a configuration may be adopted in which a light blocking film is separately provided at the counter substrate 20, and the heater 74 provided at the dust-proof glass 70 assists the light blocking function of the light blocking film provided at the counter substrate 20 together with heating. In such a configuration, the light blocking film provided at the counter substrate 20 has the same shape as the hatched region 72 in FIG. 9, for example.

In a case where the light blocking film provided in the counter substrate 20 has the same shape as the region 72, it is preferable that the heater 74 of the first exemplary embodiment and the heater wiring 740 of the second exemplary embodiment overlap with the region 72 in plan view, and the widths of the heater 74 and the heater wiring 740 are narrower than the width of the region 72.

In addition, the widths of the region 72, the heater 74, and the heater wiring 740 refer to dimensions in a direction orthogonal to the extending direction thereof.

In a configuration in which the widths of the heater 74 and the heater wiring 740 are the same as the width of the region 72, a positional deviation is not allowed when the counter substrate 20 and the dust-proof glass 70 are bonded to each other. This is because, if the position is shifted, an adverse effect such as narrowing of a region to be exposed in the display region 5 occurs.

On the other hand, in the configuration in which the widths of the heater 74 and the heater wiring 740 are narrower than the width of the region 72, even when a positional deviation occurs at the time of bonding the counter substrate 20 and the dust-proof glass 70, the positional deviation is allowed as long as the amount of the positional deviation falls within the amount corresponding to the narrow width.

In the exemplary embodiment, etc., the electro-optical device 10 has been described as a transmission-type liquid crystal panel, but may be configured as a reflection-type by, for example, forming the pixel electrode 32 as a reflective metal film or providing a reflective layer under the pixel electrode 32.

In the exemplary embodiment, etc., the dust-proof glass 70 provided with the heater 74 is bonded to the counter substrate 20. However, if a dust-proof measure is separately performed in the counter substrate 20, a substrate provided with the heater 74 may be bonded to the element substrate 30. In addition, a configuration may be adopted in which a substrate provided with the heater 74 is bonded to the counter substrate 20, and another substrate provided with the heater 74 is bonded to the element substrate 30.

Supplementary Description

For example, the following aspects of the present disclosure are understood from the embodiments illustrated above.

An electro-optical device according to an aspect (aspect 1) includes a first substrate, a second substrate, an electro-optical layer disposed between the first substrate and the second substrate, an electrode disposed between the second substrate and the electro-optical layer, and a third substrate bonded to at least one substrate of the first substrate or the second substrate, the third substrate including a heating member disposed at a position outside a display region and overlapping with the electrode in plan view.

According to this aspect, since the heating member is disposed at the third substrate, the parasitic capacitance generated between the heating member and the electrode provided at the second substrate is reduced. Therefore, even if the voltage applied to the heating member fluctuates, the influence on the display can be reduced.

In the electro-optical device according to a specific aspect 2 of the aspect 1, the heating member is disposed at a counter surface of the third substrate, the counter surface facing the one substrate. According to the aspect 2, it is possible to efficiently heat the electro-optical layer compared to a configuration in which the heating member is disposed at the opposite surface.

In the electro-optical device according to a specific aspect 3 of the aspect 1, the heating member is disposed at an opposite surface of the third substrate, the opposite surface being opposite from the one substrate. According to the aspect 3, it is possible to reduce the parasitic capacitance generated between the heating member and the common electrode, compared to a configuration in which the heating member and the common electrode are provided at the counter surface.

In the electro-optical device according to a specific aspect 4 of the aspect 1, the second substrate includes a light blocking member disposed outside a display region in plan view, and the heating member overlaps with the light blocking member in plan view, is disposed along the display region, and has a width narrower than a width of the light blocking member. According to the aspect 4, the heating member does not affect the light blocking property of the light blocking member.

In the electro-optical device according to a specific aspect 5 of the aspect 1, the heating member includes a transparent electrode overlapping with the display region in plan view, and a refractive film disposed on at least one of a first surface or a second surface of the transparent electrode intersecting a thickness direction of the second substrate. According to the aspect 5, the transparent electrode can uniformly heat the display region.

In the electro-optical device according to a specific aspect 6 of the aspect 5, the refractive film is disposed between the transparent electrode and an insulating layer, a refractive index of the insulating layer is 1.45 or more and less than 1.70, a refractive index of the refractive film is 1.50 or more and less than 1.80, and a refractive index of the transparent electrode is 1.80 or more and less than 2.00. According to the aspect 6, it is possible to suppress a decrease in transmittance due to the transparent electrode.

The electro-optical device according to a specific aspect 7 of the aspect 1 includes a first flexible substrate electrically coupled to a first coupling portion disposed at the first substrate, and a second flexible substrate electrically coupled to the heating member via a second coupling portion disposed at the second substrate.

In the electro-optical device according to a specific aspect 8 of the aspect 7, the first coupling portion is disposed at one side outside a rectangle in which the first substrate and the second substrate overlap with each other in plan view, and the second coupling portion is disposed outside the rectangle in plan view and at another side excluding the one side.

In the electro-optical device according to a specific aspect 9 of the aspect 7, wiring is disposed at the second flexible substrate, the wiring being configured to apply a constant voltage to the heating member.

The electro-optical device according to a specific aspect 10 of the aspect 9 includes a temperature sensor, wherein a constant voltage corresponding to a detection value of the temperature sensor is applied to the wiring of the second flexible substrate. According to the aspect 10, it is possible to control heating of the electro-optical device according to the detection value of the temperature sensor.

An electronic apparatus according to an aspect 11 includes the electro-optical device according to any one of aspects 1 to 10.

What is claimed is:

1. An electro-optical device comprising:
   a first substrate including:
   a scanning line drive circuit disposed along a first direction outside a display region in plan view, and
   a data line drive circuit disposed along a second direction intersecting the first direction outside the display region in plan view;
   a second substrate;
   an electro-optical layer disposed between the first substrate and the second substrate;
   an electrode disposed between the second substrate and the electro-optical layer; and
   a third substrate bonded to at least one substrate of the first substrate or the second substrate, the third substrate including a heating member disposed at a position outside the display region and having a light blocking property, wherein
   the heating member overlaps with the scanning line drive circuit, the data line drive circuit, and the electrode in plan view.

2. The electro-optical device according to claim 1, wherein
   the heating member is disposed at a counter surface of the third substrate, the counter surface facing the at least one substrate.

3. The electro-optical device according to claim 1, wherein
   the heating member is disposed at an opposite surface of the third substrate, the opposite surface being opposite from the at least one substrate.

4. The electro-optical device according to claim 1, wherein
   the second substrate includes a light blocking member disposed outside a display region in plan view, and
   the heating member overlaps with the light blocking member in plan view, is disposed along the display region, and has a width narrower than a width of the light blocking member.

5. The electro-optical device according to claim 1, wherein
   the heating member includes:
   a transparent electrode overlapping with the display region in plan view; and
   a refractive film disposed at at least one of a first surface or a second surface of the transparent electrode intersecting a thickness direction of the second substrate.

6. The electro-optical device according to claim 5, wherein
   the refractive film is disposed between the transparent electrode and an insulating layer,
   a refractive index of the insulating layer is 1.45 or more and less than 1.70,
   a refractive index of the refractive film is 1.50 or more and less than 1.80, and
   a refractive index of the transparent electrode is 1.80 or more and less than 2.00.

7. The electro-optical device according to claim 1, comprising:
   a first flexible substrate electrically coupled to a first coupling portion disposed at the first substrate; and
   a second flexible substrate electrically coupled to the heating member via a second coupling portion disposed at the third substrate.

8. The electro-optical device according to claim 7, wherein
   the first coupling portion is disposed at one side outside a rectangle in which the first substrate and the second substrate overlap with each other in plan view, and
   the second coupling portion is disposed outside the rectangle in plan view and at another side excluding the one side.

9. The electro-optical device according to claim 7, wherein
   wiring is disposed at the second flexible substrate, the wiring being configured to apply a constant voltage to the heating member.

10. The electro-optical device according to claim 9, comprising a temperature sensor, wherein
    a constant voltage corresponding to a detection value of the temperature sensor is applied to the wiring of the second flexible substrate.

11. An electronic apparatus comprising the electro-optical device described in claim 1.

12. The electro-optical device according to claim 1, wherein
    the heating member is in a frame-shape that completely surrounds the display region in plan view.

13. An electro-optical device comprising:
    a first substrate;
    a second substrate;
    an electro-optical layer disposed between the first substrate and the second substrate;
    an electrode disposed between the second substrate and the electro-optical layer; and
    a third substrate bonded to at least one substrate of the first substrate or the second substrate, the third substrate including a heating member disposed at a position outside a display region and overlapping with the electrode in plan view, wherein
    the heating member includes:
    a transparent electrode overlapping with the display region in plan view; and a refractive film disposed at at least one of a first surface or a second surface of the transparent electrode intersecting a thickness direction of the second substrate,
the refractive film is disposed between the transparent electrode and an insulating layer,
a refractive index of the insulating layer is 1.45 or more and less than 1.70,
a refractive index of the refractive film is 1.50 or more and less than 1.80, and
a refractive index of the transparent electrode is 1.80 or more and less than 2.00.

* * * * *